(12) United States Patent
Nordvik et al.

(10) Patent No.: US 11,884,891 B2
(45) Date of Patent: Jan. 30, 2024

(54) ENVIRONMENTALLY FRIENDLY FLOW IMPROVERS WITH IMPROVED FORMULATION STABILITY AT LOW TEMPERATURES

(71) Applicant: Cameron International Corporation, Houston, TX (US)

(72) Inventors: Tore Nordvik, Sandnes (NO); Rachael Anne Cole, Sandnes (NO); Chandrashekhar Yeshwant Khandekar, Humble, TX (US); Pradyumna Avinash Deshpande, Aberdeen (GB)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 10 days.

(21) Appl. No.: 17/609,898

(22) PCT Filed: May 12, 2020

(86) PCT No.: PCT/US2020/032479
§ 371 (c)(1),
(2) Date: Nov. 9, 2021

(87) PCT Pub. No.: WO2020/231994
PCT Pub. Date: Nov. 19, 2020

(65) Prior Publication Data
US 2022/0220405 A1   Jul. 14, 2022

Related U.S. Application Data (60) Provisional application No. 62/848,283, filed on May 15, 2019.

(51) Int. Cl.
*C10L 10/06* (2006.01)
*C09K 8/524* (2006.01)
(Continued)

(52) U.S. Cl.
CPC .............. *C10L 10/16* (2013.01); *C09K 8/524* (2013.01); *C09K 8/588* (2013.01); *C10L 1/1983* (2013.01);
(Continued)

(58) Field of Classification Search
None
See application file for complete search history.

(56) References Cited

U.S. PATENT DOCUMENTS

2008/0096772 A1\*  4/2008  Wilkes ................ C10M 149/22
                                                     507/90
2010/0130385 A1   5/2010  Guzmann et al.
(Continued)

FOREIGN PATENT DOCUMENTS

WO       9612755 A1     5/1996

OTHER PUBLICATIONS

International Search Report and Written Opinion issued in the PCT Application PCT/US2020/032479, dated Aug. 27. 2020 (12 pages).

*Primary Examiner* — Aiqun Li
(74) *Attorney, Agent, or Firm* — Jeffrey D. Frantz (57) ABSTRACT

A method of treating petroleum fluids may include adding a flow improver composition to the petroleum fluids, the flow improver composition, comprising: a solvent; and a dendrimer-based flow improver, wherein at least a portion of the surface sites of the dendrimer are chemically modified with saturated and unsaturated fatty acids.

15 Claims, 3 Drawing Sheets

(51) Int. Cl.
*C09K 8/588* (2006.01)
*C10L 1/198* (2006.01)
*C10L 1/2383* (2006.01)
*C10L 10/16* (2006.01)

(52) U.S. Cl.
CPC ......... *C10L 1/2383* (2013.01); *C10L 2250/04* (2013.01)

(56) References Cited

U.S. PATENT DOCUMENTS

| | | |
|---|---|---|
| 2013/0196882 A1 | 8/2013 | Firmano Junior |
| 2014/0224495 A1 | 8/2014 | Khandekar et al. |
| 2016/0185917 A1 | 6/2016 | Drummond et al. |

* cited by examiner

ENVIRONMENTALLY FRIENDLY FLOW IMPROVERS WITH IMPROVED FORMULATION STABILITY AT LOW TEMPERATURES

CROSS REFERENCE PARAGRAPH

This application claims the benefit of U.S. Provisional Application No. 62/848,283 entitled "Environmentally Friendly Flow Improvers with Improved Formulation Stability at Low Temperatures," filed May 15, 2019, the disclosure of which is incorporated herein by reference.

BACKGROUND

Hydrocarbon fluids, during the production and transportation from reservoir to the surface and onward to refinery undergo pressure and temperature changes. These changes, along with changes in operating conditions, can lead to destabilization and precipitation of various components in the fluids (e.g., paraffins, asphaltenes, scales). Under favorable conditions, these precipitated components can cause significant flow assurance challenges including, but not limited to, an increase in fluid viscosity and deposition of solids on pipeline surfaces. These, in turn, can then cause numerous operational challenges such as flow restriction in a pipeline, increased solids during pigging operations leading to decreased cleaning efficiency, or higher pipeline back pressure leading to lower throughput.

Paraffin precipitation and deposition and its effect of fluid flow in a pipeline remains one of the biggest challenge in the oilfield industry. For example, at low temperature, paraffins may precipitate as large crystals or spherulites of wax in such a way as to form a gel structure which can cause produced petroleum fluids or other oil-based fluids to lose their ability to flow. Paraffin precipitation and deposition is a function of many parameters including but not limited to fluid composition, water cut, fluid velocity, temperature etc. Paraffins have a general chemical formula of $C_nH_{2n+2}$, and usually $C_{18+}$ paraffins present difficulties due to their precipitation and deposition as a result of cooling and depressurization processes. To overcome these challenges, various thermal, mechanical and chemical methods are used in the oilfield industry including pigging, scraping, hot oiling and using paraffin inhibitors, pour point depressants, paraffin dispersants, paraffin solvents and combinations thereof.

Paraffin inhibitors, typically crystalline/amorphous polymers, also known as wax crystal modifiers, are used in oil field industry to delay the onset of wax precipitation in hydrocarbon fluids and to mitigate the extent of wax deposition on the metal surfaces. These polymers, usually formulated in aliphatic or aromatic solvents, are injected above the wax appearance temperature ("WAT"). A part of the wax inhibitor, which co-crystallizes with the paraffin's has a structure that is similar to the waxes and is nonpolar in nature. There is typically a polar component present in the structure which limits the degree of co-crystallization. The paraffin inhibitors/wax crystal modifiers interfere with the wax crystallization by modifying the wax crystal morphology. The ill formed crystal (also called a malcrystal) cannot form networks thereby preventing deposition of wax on the pipeline surface.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of treating petroleum fluids that includes adding a flow improver composition to the petroleum fluids, the flow improver composition, comprising: a solvent; and a dendrimer-based flow improver, wherein at least a portion of the surface sites of the dendrimer are chemically modified with saturated and unsaturated fatty acids.

In another aspect, embodiments disclosed herein relate to a method that includes adding a flow improver composition to a first hydrocarbon fluid to produce a second hydrocarbon fluid, the flow improver composition comprising a solvent; and a dendrimer-based flow improver, wherein at least a portion of the surface sites of the dendrimer are chemically modified with saturated and unsaturated fatty acids In yet another aspect, embodiments disclosed herein relate to a method that includes extracting a hydrocarbon fluid from a well; and adding a flow improver composition to the hydrocarbon fluid, the flow improver composition comprising a solvent; and a dendrimer-based flow improver, wherein at least a portion of the surface sites of the dendrimer are chemically modified with saturated and unsaturated fatty acids.

Other aspects and advantages of the claimed subject matter will be apparent from the following description and the appended claims.

DETAILED DESCRIPTION

Broadly, the present disclosure provides compositions of a flow improver for treating a fluid, and more specifically, a hydrocarbon fluid. For purposes herein, a hydrocarbon fluid refers to any fluid which comprises a hydrocarbon. Hydrocarbon fluids of the present disclosure may include crude oil, crude oil condensate, and the various streams which are produced during extraction of hydrocarbons from wells. Also included are refined streams including various fuel oils, diesel fuel, kerosene, gasoline, and the like.

At the temperature of a reservoir, hydrocarbons may be primarily liquid or gaseous. As the production stream rises to the surface and leaves the wellhead, the temperature and pressure start to decrease, and the stream begins to cool from the elevated temperature and pressure as compared to the temperature and pressure of the wellhead. This chilling may have a number of effects, including gelling, undesirable rheology changes, or deposition of waxes, asphaltenes, etc., which may affect downstream production operations. The wax deposits formed may contain n-paraffins (linear alkanes) and small amounts of branched or isoparaffins and aromatic compounds (cycloparaffins, naphthalenes). The carbon number of paraffinic molecules present in wax deposits may be C15 or higher and may reach up to C80. Studies have also indicated that the quantity of wax formation that will prevent flow or result in a gel in an oil is quite small.

To overcome these challenges, the flow improvers of the present disclosure may be added to a hydrocarbon fluid (including a hydrocarbon being produced from a reservoir), thereby improving the flow thereof. In embodiments, it is understood that the flow improver, may at least in part disperse (and/or inhibit) wax crystals present in the hydrocarbon fluid that impede the flow thereof. The paraffin/wax inhibitors may modify and disrupt the normal paraffin crystal formation mechanism and thus decrease the crystal growth of paraffin/wax particles, thereby reducing their precipitation and deposition, effectively dispersing them and improving the flowability of petroleum fluids that might otherwise be susceptible to flow problems associated with paraffin/wax deposition. Without being bound by theory, it is believed that the wax inhibitors, when added above the wax appearance temperature (WAT or the temperature at which waxes or paraffins in a petroleum fluid first crystallize), prevent or reduce paraffin deposition by a modification of paraffin crystal size and shape. However, it has conventionally been extremely difficult to winterize conventional flow improvers including paraffin/wax inhibitors due to the low solubility they exhibit at low temperatures in the solvents that are used to formulate the inhibitor compositions. Thus, generally, in order to make homogenous inhibitor compositions that have low temperature stability (i.e., winterized inhibitor compositions), the polymers conventionally used for flow improvement/paraffin inhibition are highly diluted in solvents. As a result of the high dilution factor needed to achieve winterization, large volume applications/dosages of the conventional compositions have to be used to achieve the desired flow/inhibitor performance. Moreover, while some compositions have been developed that do have stability at low temperatures, they also tend to have very low activity for wax inhibition and therefore higher quantities are still needed for the dosing to achieve the desired wax inhibition.

Embodiments disclosed herein relate generally to production chemical compositions, including flow improver/wax inhibitor compositions, with improved winterization properties and a high degree of flow improver/wax inhibition activity and methods of using said compositions. As used herein, improved winterization refers to the ability of compositions to remain stable and functional at low temperatures. For example, production chemicals are often stored in aboveground tanks and applied as needed. In regions of the world where temperatures may fall below the freezing/gel point of the production chemical compositions, their storage in aboveground tanks may result in the need for a higher dilution in a solvent to avoid their becoming unstable. Improved winterization of the production chemical compositions may improve their stability in colder environments and negate the need for a high dilution of the active ingredient. Further, the flow improvers/wax inhibitors disclosed herein are more environmentally friendly than conventional wax inhibitors in that they demonstrate significant biodegradability and thus may be particularly useful in subsea applications.

Flow Improver/Wax Inhibitor

In one or more embodiments, the flow improver/paraffin/wax inhibitor of the present disclosure may be a dendrimer that has at least a portion of its surface sites chemically modified with unsaturated fatty acids in combination with saturated fatty acids. Dendrimers have a sphere-like morphology resulting from the outward growth of dendrimers in a branching fashion starting from a core "initiator" molecule where each added outer layer, or generation, contains exponentially more branching points. The growth habit of dendrimers leads to a high degree of outer surface sites/branching points per volume of the dendrimer. In one or more embodiments, the dendrimer may have at least three generations, or at least five generations of growth, to endow its surface with a significant amount of outer surface sites/branch points. These surface sites/branch points may be chemically modified with a combination of unsaturated fatty acids and saturated fatty acids. Thus, once at least a portion of the surface sites of the dendrimer are chemically modified with the fatty acids, at least a portion of the outermost portion of the dendrimer (e.g., the dendrimer surface) will include the fatty acids. While the surface sites of the dendrimer may be chemically modified through any chemistry amenable to chemically attach fatty acids to the terminal groups of the particular dendrimer used, a particularly useful modification reaction may be the esterification or amidation of the dendrimer by the fatty acids.

In one or more embodiments, the non-modified, or base, dendrimer may be at least one of a polyester polyol dendrimer (e.g., Boltorn™ type, available from Perstorp), a polyethylenimine (PEI) dendrimer, polyamidoamine (PAMAM) dendrimers, poly (glycerol succinic acid) (PGLSA) dendrimers, and poly(propylene imine) (DAB) dendrimer.

An example of the chemical structure of a polyester polyol dendrimer is shown below.

An example of the chemical structure of a polyethylenimine (PEI) type dendrimer is shown below.

In one or more embodiment, the unsaturated fatty acids that are used to chemically modify the base dendrimer may be C12-C30 fatty acids with at least one unsaturation or C16-C26 fatty acids with at least one unsaturation. For example, the base dendrimer may be chemically modified by esterification or amidation (depending on the type of dendrimer) with oleic acid (C18) or erucic acid (C22). Without being bound by theory, it is believed that the double bond, or unsaturation, on the unsaturated fatty acid may make the molecule more prone to biodegradation, allowing for the dendrimer-based wax inhibitor to have a favored environmental profile.

In one or more embodiments, the dendrimer that has at least a portion of its surface chemically modified by esterification with unsaturated fatty acids may also have at least a portion of its surface chemically modified by esterification with saturated fatty acids. In one or more embodiment, the saturated fatty acids that are used to chemically modify the base dendrimer may be C12-C30 fatty acids or the saturated fatty acids may be C16-C26 fatty acids. For example, the dendrimer that has at least a portion of its surface chemically modified by esterification with unsaturated fatty acids may also have at least a portion of its surface chemically modified by esterification or amidation with behenic acid (a.k.a. docosanoic acid). In one or more embodiments, the chemical modification of the base dendrimer with both saturated and unsaturated fatty acids may occur simultaneously or in other embodiments the chemical modification may occur sequentially.

Significantly, the dendrimer-based flow improver/wax inhibitors of the present disclosure have been found to have high activity for wax inhibition and significant low temperature stability when the dendrimers have a combination of both saturated and unsaturated fatty acids reacted on at least a portion of their surface. Indeed, dendrimer-based compounds that were functionalized with only saturated fatty acids showed wax inhibitor activity but lacked sufficient low temperature stability required for use in colder environments. Conversely, dendrimers that were functionalized with only unsaturated fatty acids possessed low temperature stability but had a lower activity. Therefore, in one or more embodiments, the mole ratio of unsaturated fatty acids to saturated fatty acids that functionalize the dendrimer may range between about 10:1 to 1:10. That is, the fatty acid profile for the dendrimer-based flow improver/wax inhibitors may be at least about 10 mol % unsaturated fatty acids and up to about 90 mol % unsaturated fatty acids on the basis of total fatty acid modification. In one or more embodiments, the fatty acid profile for the dendrimer-based flow improver/wax inhibitors may be at least about 20 mol %, or at least about 30 mol %, or at least about 40 mol %, or at least about 50 mol %, or at least about 60 mol %, or at least about 70 mol %, or at least about 80 mol % unsaturated fatty acids on the basis of total fatty acid modification. In one or more embodiments, the fatty acid profile for the dendrimer-based flow improver/wax inhibitors may be at most about 80 mol %, or at most about 70 mol %, or at most about 60 mol %, or at most about 50 mol %, or at most about 40 mol %, or at most about 30 mol %, or at most about 20 mol % of unsaturated fatty acids on the basis of total fatty acid modification.

In one or more embodiments, the degree of chemical modification of the dendrimers with the fatty acids (i.e., both saturated and unsaturated) may be controlled in order to tailor the properties of the resultant dendrimer-based wax inhibitor. For example, the amount of end groups on the surface of the base dendrimer (e.g., those that are capable of being functionalized) may be determined based upon the base-dendrimers molecular weight. Once this value is known, a functionalization strategy may be used wherein at least a portion of the available end groups are chemically modified with fatty acids. For example, the amount of fatty acids used, the time allowed for reaction, and/or the temperature may be modulated to achieve a certain degree of functionalization. In some instances, the degree of dendrimer chemical modification by fatty acids is indicated as a percent surface coverage. In one or more embodiments, the dendrimers of the present disclosure may be at least 25% chemically modified, at least 50% chemically modified, at least 75% chemically modified, or at least 90% chemically modified with fatty acids.

In one or more embodiments, the molecular weight (number average) of the base-dendrimer or the chemically modified dendrimer may be from about 1000 to 80000 g/mol. For example, in one or more embodiments, the polyester polyol dendrimer may be used as a base dendrimer at a molecular weight ranging from 1000 to 10000 g/mol. In one or more embodiments, the polyester polyol dendrimer may be used as the base dendrimer and have a molecular weight of at least 5000 g/mol for the core without any substitution of the end groups. In one or more embodiments, the polyethyleneimine dendrimer may be used as the base dendrimer at a molecular weight ranging from 1000 to 80000 g/mol, or from about 2000 to 60000 g/mol, or from about 3000 to 45000 g/mol, or from about 4000 to 37500 g/mol, or from about 4750 to 30000.

In one or more embodiments, the wax inhibitor composition may include between about 1 to about 55 weight percent, or about 5 to about 50 weight percent, or about 10 to about 40 weight percent, or about 15 to about 35 weight percent of the dendrimer based wax inhibitor described above.

In one or more embodiments, the wax inhibitor composition may include one or more solvents. The solvent used in the composition may be chosen from the group including, but not limited, to aliphatic hydrocarbons including cyclic hydrocarbons (e.g., cyclohexane, cyclopentane), organic esters (i.e. ethyl acetate), aromatic hydrocarbons (e.g., benzene, toluene, xylene, light or heavy solvent naphtha, Aromatic 150), and ethers. The solvents are typically simply mixed with the flow improver/wax inhibitor described above to form a flow improver/wax inhibitor composition. In some embodiments, the solvent in the composition is in an amount from 20 wt. % to 99 wt. %. For example, the lower limit may be any of 20, 30, 40, 50, or 60 weight percent, and the upper limit may be any of 50, 60, 70, 80, 90, 95, or 99 weight percent, where any lower limit can be used in combination with any upper limit.

The wax inhibitor composition may also contain various optional ingredients for improving low temperature flowability and/or other properties, including, without limitation, antioxidants, corrosion inhibitors, cold flow improvers (including, without limitation, comb polymers, polar nitrogen compounds, compounds containing a cyclic ring system, hydrocarbon polymer, polyoxyalkylene compounds, mixtures thereof and the like), dehazers, demulsifiers, antifoaming agents, cetane improvers, cosolvents, corrosion inhibitors, scale inhibitors, biocides, and lubricity additives, either used individually or in combinations thereof.

In use, the wax inhibitor compositions according to one or more embodiments of the present disclosure may be mixed with petroleum fluids, including, but not limited to crude oil to minimize wax deposition. Crude oils, i.e. oil obtained directly from drilling and before refining, vary widely in their physical and chemical properties from one geographical production region to another, and even from field to field. Crude oils are usually classified into three groups according to the nature of the hydrocarbons they contain: paraffinic, naphthenic, asphaltic, and mixtures thereof. The differences are due to the different proportions of the various molecular types and molecular sizes of the molecules making up the crude oil. Paraffinic crude oils often have a relatively high wax content, e.g. a wax content of 0.1 to 20% by weight percent of oil, or in some instances 3 to 5 wt %, measured at 10° C. below the wax appearance temperature.

The mixing of the flow improver/wax inhibitor compositions according to the present disclosure into a petroleum fluid may occur either downhole, in a subsea environment, or aboveground, after the petroleum fluids have been produced from a reservoir. In one or more embodiments, the composition of the present disclosure may be added to a hydrocarbon fluid produced from a well at the well head or at the surface. For example, in some embodiments, the flow improver/wax inhibitor composition may be added to a hydrocarbon fluid prior to transporting the hydrocarbon fluid in a pipeline or a tank. In one or more embodiments, the flow improver/wax inhibitor composition may be mixed with the hydrocarbon fluid batch wise (e.g., in a tank prior to transport) or continually/continuously, such as added to a line containing flowing liquid hydrocarbon. In some embodiments, the liquid hydrocarbons may be treated with the flow improver/wax inhibitor composition within a pipeline, tank, or other vessel carrying or holding the liquid hydrocarbons located in a subsea environment. Significantly, the flow improver/wax inhibitor compositions do not require dilution and maintains liquidity and phase stability at low temperatures, thereby allowing the end user to directly dose the products as-is.

The amount of flow improver/wax inhibitor composition used in treating petroleum fluids will vary according to various factors such as the base fluid type, the paraffin content in the fluid, the n-paraffin carbon number distribution for the fluid, the degree of WAT corrections desired, the ambient conditions, etc. The optimum dose rate is normally estimated by means of laboratory measurements such as wax appearance temperature, viscosity, gel strength, wax deposition tendency, etc. Therefore, there are no limitations in this regard. Methods in accordance with the present disclosure may include admixing a flow improver composition of the present disclosure with a hydrocarbon fluid in an effective amount, i.e., an amount sufficient to produce some reduction in the appearance of waxes or poorly soluble aggregates at decreased temperatures as compared to an untreated fluid. For example, flow improver compositions may be added at a concentration that may range from a lower limit selected from any of 0.0001 percent by weight (wt %), 0.001 wt %, 0.1 wt %, 1 wt %, and 2 wt % to an upper limit selected from any of 1 wt %, 2 wt %, 5 wt %, 10 wt %, and 15 wt %, where the concentration of the flow improver composition may range from any lower limit to any upper limit. In yet other embodiments, the concentration of the flow improver composition in the hydrocarbon fluid may range from about 0.001 wt % to about 10 wt %. However, one skilled in the art would appreciate that the desired concentration of flow improver composition may depend on the type of fluid being treated, and that the desirable amount is an amount sufficient to achieve the highest variance in wax appearance temperature and viscosity at the lowest reasonable dosage.

It is to be understood that the wax inhibitor compositions of the present disclosure may also be effective for reducing the deposition of asphaltenes in addition to waxes. It is also understood that the wax inhibitor composition may be used alone or in combination with other additives including dewaxing auxiliaries, corrosion inhibitors, asphaltene inhibitors, scale inhibitors, hydrate inhibitors, antioxidants, lubricity additives, dehazers, conductivity improvers, cetane number improvers, sludge inhibitors, and the like.

In an embodiment, a method comprises adding a flow improver according to any one or combination of embodiments disclosed herein to a first hydrocarbon fluid to produce a second hydrocarbon fluid. In an embodiment, the first hydrocarbon fluid is a hydrocarbon fluid produced during extraction of hydrocarbons from a well, crude oil, a crude oil condensate, a middle distillate, a fuel oil, diesel, or a combination thereof.

In an embodiment, a method comprises extracting a hydrocarbon fluid from a well and adding a flow improver according to any one or combination of embodiments disclosed herein to the hydrocarbon fluid. In an embodiment, flow improver is added to the hydrocarbon fluid prior to the hydrocarbon fluid being extracted from the well, the flow improver is added to the hydrocarbon fluid after the hydrocarbon fluid has been extracted from the well, or a combination thereof. In an embodiment, the well is located underwater. In an embodiment, the well is a deep water well located at least 1000 meters below the surface of the water.

In an embodiment, the flow improver is added to a subterranean well. In an embodiment, the flow improver may be added to a hydrocarbon fluid in the well (i.e. a first hydrocarbon fluid). In an embodiment, a hydrocarbon fluid containing the flow improver (i.e. a second hydrocarbon fluid) may be produced from the well. In another embodiment, the flow improver may be added to a hydrocarbon fluid produced from a well at the well head or at the surface. In still another embodiment, the flow improver is added to a hydrocarbon fluid prior to transporting the hydrocarbon fluid in a pipeline or a tank.

EXAMPLES

Several dendrimer-based wax inhibitors were prepared by the Fischer esterification of a polyester polyol dendrimer with various fatty acids. In particular, the polyester polyol dendrimer is Boltorn™ H311, supplied by Perstorp, and has a molecular weight of about 5700 g/mol is subjected to esterification with at least different ratios of fatty acids selected from behenic acid (a.k.a. docosanoic acid) a C22 saturated fatty acid, erucic acid (a.k.a. cis-13-docosanoic acid) a C22 unsaturated fatty acid, and oleic acid (a.k.a. cis-9-octadecanoic acid) a C18 unsaturated fatty acid. The fatty acids were supplied by KLK Oleo.

More specifically, Example 1 is a polyester polyol dendrimer that has been chemically modified with only behenic acid (i.e., it has no unsaturated fatty acid modification). Examples 2-4 are polyester polyol dendrimers that have been chemically modified with a mixture of behenic acid and erucic acid, with each example using a different ratio of behenic acid to erucic acid.

The wax inhibitors of Examples 1–4 were formulated into wax inhibitor compositions by mixing with Aromatic 150 to form a 20 percent by weight wax inhibitor solution. The pour point and cloud point of these solutions are shown in Table 1. Table 1 also shows the results for a static aging test of each formulation. The static aging tests were conducted at 4° C. and an amount of each formulation was placed in a vial and examined at various points over 35 days. If the formulation remained a liquid then it was said to be "OK", while if it gelled or otherwise solidified it was said to fail (represented by "F" in Table 1).

that of the surrounding oil. Specifically, a hydrocarbon fluid is heated at 130° F. An 80 ml of the heated hydrocarbon fluid is transferred to a glass jar, followed by injection of Example 1 or 4 at 1000 ppm. Upon addition of the flow improver/wax inhibitor, the glass jar is sealed and shaken. Next, the glass jar is placed back to the water bath at 130° F. for 30 minutes. Then, the glass jar is attached to a cold finger unit and immersed into the water bath which is preheated to 130° F. with constant stirring. After 30 minutes, the water bath temperature is set to 80° F. and the cold finger temperature is set at 50° F. After the glass jar is under the conditions for 20 hours, it is removed from the water bath and from the cold finger unit subsequently. The wax deposit is collected and weighed. Wax inhibition percentage is calculated by the following equation.

$$\% \text{ Wax inhibition} = \frac{\text{Untreated fluid wax, } g - \text{Treated fluid wax, } g}{\text{Untreated fluid wax, } g} \times 100$$

Figure 4:
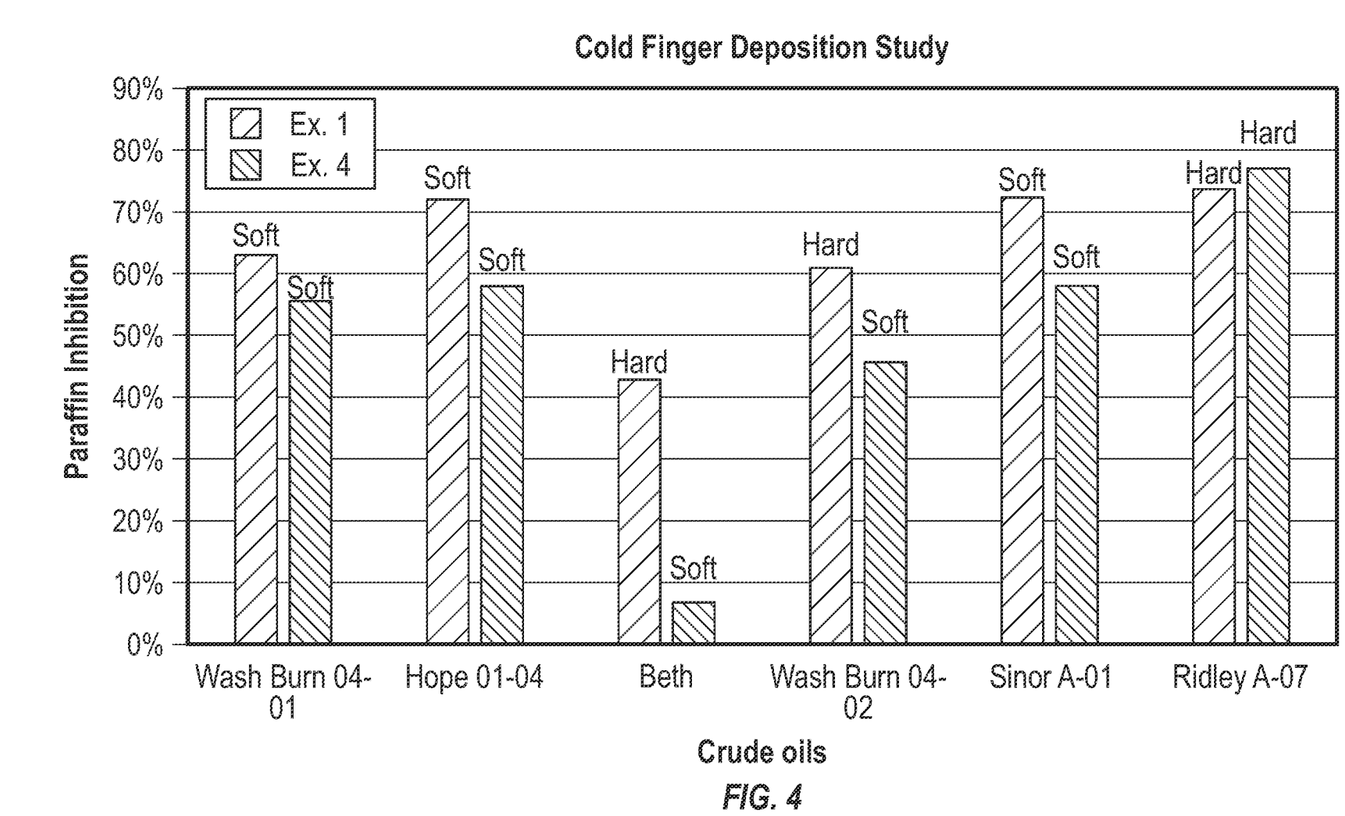
FIG. 4 shows results of a cold finger deposition study.

The cold finger deposition study added the composition of Example 1 or Example 4 to each oil sample to compare performance. The samples having the composition of Example 1 are shown as the left-most bar of each pair of plots, with the right-most sample being the samples having the composition of Example 4. A soft wax is preferred over a hard wax because it is easier to remove when pigging the production lines or when treated with hot solvents/oils.

TABLE 1

| Example Wax Inhibitor | Activity (%) | Pour Point (° C.) | Cloud Point (° C.) | Static Test (4° C.) Days | | | | | | Centrifuge Test (1000 RPM) Hours | | | | Centrifuge Test (2000 RPM) Hours | | | |
|---|---|---|---|---|---|---|---|---|---|---|---|---|---|---|---|---|---|
| | | | | 1 | 7 | 14 | 21 | 28 | 35 | 2 | 4 | 6 | 8 | 2 | 4 | 6 | 8 |
| 1 | 20 | 15 | 16 | F | F | F | F | F | F | F | F | F | F | F | F | F | F |
| 2 | 20 | −12 | 5 | H | F | F | F | F | F | F | F | F | F | 2% Gel | 2% Gel | 4% Gel | 4% Gel |
| 3 | 20 | −18 | 3 | OK | F | F | F | F | F | F | F | F | F | OK | OK | 1% Gel | 1% Gel |
| 4 | 20 | −27 | 0 | OK | OK | OK | OK | OK | OK | OK | OK | OK | OK | OK | OK | 1% Gel | 1% Gel |

Figure 1:
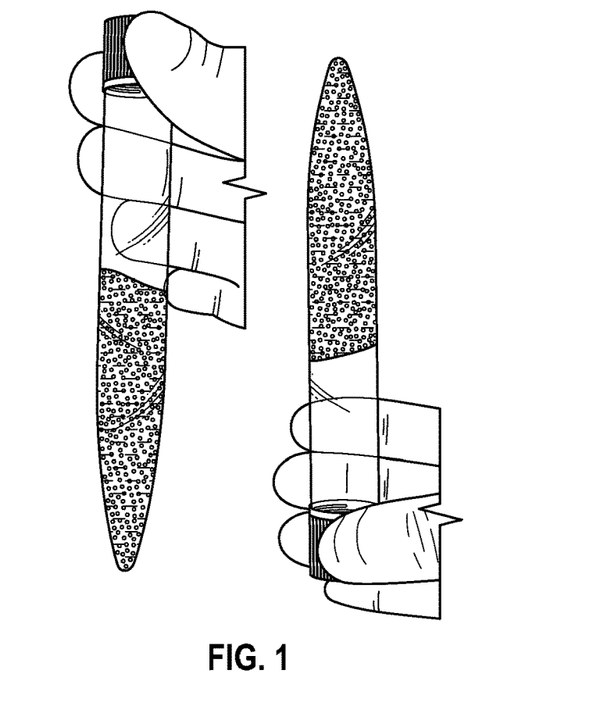
FIGS. 1 to 2 show results of static aging.
Figure 2:
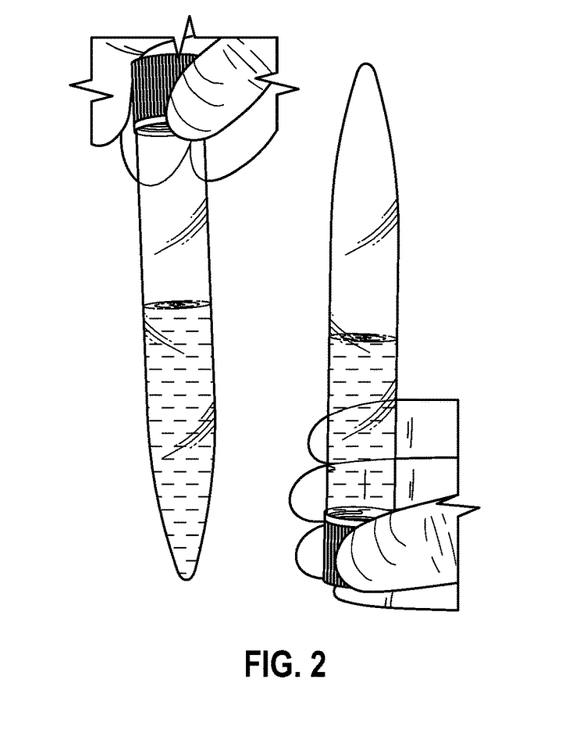

FIG. 1 shows a digital photograph of Example 1 taken after 30 days of static aging at 4° C. FIG. 2 shows a digital photograph of Example 4 taken after 30 days of static aging at 4° C.

Figure 3:
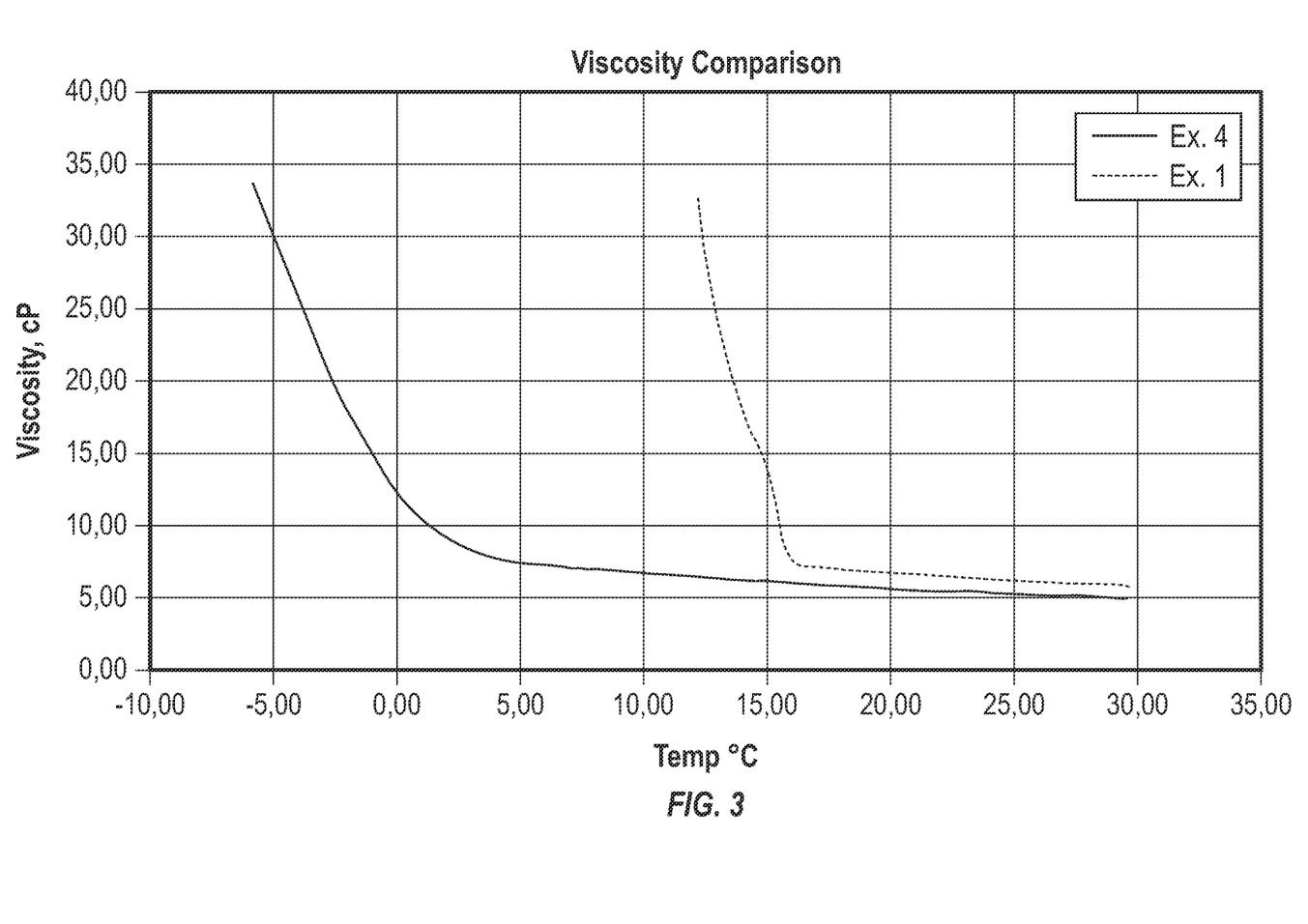
FIG. 3 shows a comparison of viscosity as a function of temperature.

FIG. 3 shows a comparison of the viscosity as a function of temperature for the wax inhibitor compositions of Example 1 and Example 4. These measurements were recorded with a Brookfield rheometer. Example 1 showed a significant increase in viscosity at about 15° C., while Example 4 showed a significant increase in viscosity at about 0° C.

The results of a cold finger deposition study on numerous oil samples from distinct wells are shown in FIG. 4. The cold finger test is conducted by using a temperature controlled chamber that keeps the sample at a prescribed temperature, typically above the sample's wax appearance temperature, and a metal tube, referred to as the cold finger, which is maintained at the desired test temperature, typically below Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of treating petroleum fluids, comprising:
   adding a flow improver composition to the petroleum fluids, the flow improver composition, comprising:
   a solvent; and
   a dendrimer-based flow improver that is a reaction product of a base dendrimer represented by the structure:

and erucic acid or behenic acid,
wherein the base dendrimer comprises surface sites and at least 50% of the surface sites are chemically modified with erucic acid or behenic acid,
wherein at least one surface site is chemically modified via amidation with erucic acid and at least one surface site is chemically modified via amidation with behenic acid, and
wherein a mole ratio of erucic acid to behenic acid that undergoes amidation on the surface sites of the dendrimer is between about 10:1 to 1:10.

2. The method of claim 1, wherein the dendrimer-based flow improver is about 1 to about 55 weight percent of the flow improver composition.

3. The method of claim 1, wherein the dendrimer-based flow improver is at least 75% chemically modified with erucic acid or behenic acid.

4. The method of claim 1, wherein a number average molecular weight of the dendrimer-based flow improver is from about 1000 to 80000 g/mol.

5. The method of claim 1, wherein the solvent is at least one of aliphatic hydrocarbons, cyclic hydrocarbons, organic esters, aromatic hydrocarbons, and ethers.

6. The method of claim 1, wherein the solvent is present in an amount of about 45 to about 99 weight percent of a total weight of the flow improver composition.

7. The method of claim 1, wherein the flow improver composition is added to the petroleum fluids at a concentration of 50 to 5000 ppm.

8. The method of claim 1, wherein the adding takes place in a subsea environment.

9. A method comprising:
adding a flow improver composition to a first hydrocarbon fluid to produce a second hydrocarbon fluid, the flow improver composition comprising a solvent; and a dendrimer-based flow improver that is a reaction product of a base dendrimer represented by the structure:

and erucic acid or behenic acid,
wherein the base dendrimer comprises surface sites and at least 50% of the surface sites are chemically modified with erucic acid or behenic acid,
wherein at least one surface site is chemically modified via amidation with erucic acid and at least one surface site is chemically modified via amidation with behenic acid, and
wherein a mole ratio of erucic acid to behenic acid that undergoes amidation on the surface sites of the dendrimer is between about 10:1 to 1:10.

10. The method of claim 9, wherein the first hydrocarbon fluid is a hydrocarbon fluid produced during extraction of hydrocarbons from a well, crude oil, a crude oil condensate, a middle distillate, a fuel oil, diesel, or a combination thereof.

11. The method of claim 9, further comprising adding the flow improver composition to the first hydrocarbon fluid in a well.

12. A method comprising:
extracting a hydrocarbon fluid from a well; and
adding a flow improver composition to the hydrocarbon fluid, the flow improver composition comprising a solvent; and a dendrimer-based flow improver that is a reaction product of a base dendrimer represented by the structure:

and erucic acid or behenic acid,
  wherein the base dendrimer comprises surface sites and at least 50% of the surface sites are chemically modified with erucic acid or behenic acid,
  wherein at least one surface site is chemically modified via amidation with erucic acid and at least one surface site is chemically modified via amidation with behenic acid, and
  wherein a mole ratio of erucic acid to behenic acid that undergoes amidation on the surface sites of the dendrimer is between about 10:1 to 1:10.

13. The method of claim 12, wherein the flow improver composition is added to the hydrocarbon fluid prior to the hydrocarbon fluid being extracted from the well.

14. The method of claim 12, wherein the flow improver composition is added to the hydrocarbon fluid after the hydrocarbon fluid has been extracted from the well.

15. The method of claim 12, wherein the flow improver composition is added to the hydrocarbon fluid while the hydrocarbon fluid is extracted from the well.

* * * * *